US011328465B2

(12) United States Patent
Pokorny et al.

(10) Patent No.: US 11,328,465 B2
(45) Date of Patent: *May 10, 2022

(54) METHODS AND SYSTEMS FOR AUGMENTED REALITY SAFE VISUALIZATION DURING PERFORMANCE OF TASKS

(71) Applicant: HONEYWELL INTERNATIONAL INC., Morris Plains, NJ (US)

(72) Inventors: Ondrej Pokorny, Merin (CZ); Michal Kosik, Dolny Kubin (SK); Marketa Szydlowska, Brno (CZ)

(73) Assignee: Honeywell International Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/079,618

(22) Filed: Oct. 26, 2020

(65) Prior Publication Data
US 2021/0104083 A1 Apr. 8, 2021

Related U.S. Application Data

(63) Continuation of application No. 16/386,644, filed on Apr. 17, 2019, now Pat. No. 10,846,899.

(51) Int. Cl.
G06T 11/60 (2006.01)
G06T 7/70 (2017.01)
(Continued)

(52) U.S. Cl.
CPC .......... G06T 11/60 (2013.01); G02B 27/0172 (2013.01); G06F 3/147 (2013.01);
(Continued)

(58) Field of Classification Search
CPC . G06T 11/60; G06T 7/70; G06T 2207/10016; G06T 2207/30196;
(Continued)

(56) References Cited

U.S. PATENT DOCUMENTS 8,144,238 B2 3/2012 Kotake et al.
9,134,534 B2 9/2015 Border et al.
(Continued)

FOREIGN PATENT DOCUMENTS

WO 2017100654 6/2017

Primary Examiner — Jeffery A Brier
(74) Attorney, Agent, or Firm — Bookoff McAndrews, PLLC

(57) ABSTRACT

Systems and methods for augmented reality (AR) safe visualization for use with a near to eye (NTE) display system worn by a user are provided. The system includes: a processor programmed with an AR program and a task database storing task data; and, a camera mounted to the NTE display system and providing video input. The processor receives the video input and coordinates video image processing of the video input to identify therein a user's hand and an object. The processor receives an intended task from the user and retrieves associated task data based thereon. The processor processes the task data with the intended task to render a visualized item, such as a job card. The processor determines when the visualized item is in front of the hand while the user is performing the task and removes the visualized item responsive thereto.

20 Claims, 5 Drawing Sheets

(51) Int. Cl.
   *G02B 27/01* (2006.01)
   *G06F 3/147* (2006.01)
   *G06K 9/00* (2006.01)

(52) U.S. Cl.
   CPC ..... *G06K 9/00355* (2013.01); *G06K 9/00664* (2013.01); *G06T 7/70* (2017.01); *G02B 2027/014* (2013.01); *G02B 2027/0138* (2013.01); *G02B 2027/0141* (2013.01); *G06T 2207/10016* (2013.01); *G06T 2207/30196* (2013.01)

(58) Field of Classification Search
   CPC .............. G06T 19/006; G02B 27/0172; G02B 2027/0138; G02B 2027/014; G02B 2027/0141; G06F 3/147; G06K 9/00355; G06K 9/00664; G06K 9/00671
   See application file for complete search history.

(56) References Cited

U.S. PATENT DOCUMENTS

| | | | |
|---|---|---|---|
| 9,142,062 B2 | 9/2015 | Maciocci et al. | |
| 9,972,133 B2 | 5/2018 | Coleman et al. | |
| 10,846,899 B2 * | 11/2020 | Pokorny | G06F 3/0304 |
| 2012/0249741 A1 | 10/2012 | Maciocci et al. | |
| 2014/0152530 A1 | 6/2014 | Venkatesha et al. | |
| 2015/0146007 A1 | 5/2015 | Dusik et al. | |
| 2016/0140868 A1 | 5/2016 | Lovett et al. | |
| 2018/0218538 A1 | 8/2018 | Short et al. | |
| 2018/0365514 A1 | 12/2018 | Kosik | |
| 2019/0097896 A1 | 3/2019 | Kritzler | |
| 2019/0333278 A1 * | 10/2019 | Palangie | G06T 7/74 |

* cited by examiner

METHODS AND SYSTEMS FOR AUGMENTED REALITY SAFE VISUALIZATION DURING PERFORMANCE OF TASKS

CROSS-REFERENCE TO RELATED APPLICATION(S)

This patent application is a continuation of and claims the benefit of priority to U.S. Nonprovisional patent application Ser. No. 16/386,644, filed on Apr. 17, 2019, the entirety of which is incorporated herein by reference.

TECHNICAL FIELD

The technical field generally relates to computer vision systems, and more particularly relates to systems and related operating methods for augmented reality safe visualization during performance of tasks.

BACKGROUND

Augmented reality (AR) technology, as may be used with near to eye displays (NTE) and smart glasses, create new benefits and opportunities for visualization of objects and task instructions associated with the maintenance of a device or equipment. Visualized objects and task instructions may be rendered on a see-through display using either two- or three-dimensional conventional AR systems. Therefore, two- and three-dimensional AR can enable a user to navigate through one or more tasks quite easily.

However, the use of conventional AR systems during performance of a task presents some limitations and technological problems. Among the most critical is the safety of the user during performance of the task. For example, during a maintenance task, it is desirable that visualization be done in a manner that does not interfere with a user's view of his hands or tools and does not otherwise disturb the user's vision. The provided systems and methods for augmented reality safe visualization during performance of tasks improve upon existing AR systems by addressing these technological problems in an unconventional way, in addition to providing other technological enhancements.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is an augmented reality (AR) safe visualization method for use with a near to eye (NTE) display system worn by a user. The method includes: at a processor associated with the NTE display system and programmed with an AR program, receiving video input; receiving an intended task; retrieving, for the intended task, an object, a tool, and a job card, from a task database; rendering a visualized job card, visualized object, and a visualized tool on the NTE display system; video image processing the video input to identify and locate a user's hand and the object; determining that the user is performing the intended task; determining when there is a job card block, defined as when the visualized job card is in front of the hand; determining when there is a tool block, defined as when the visualized tool is in front of the hand; determining when there is an object block, defined as when the visualized object is in front of the hand; removing the visualized job card, or a portion of the visualized job card in front of the hand, when there is a job card block; removing the visualized tool, or a portion of the visualized tool in front of the hand, when there is a tool block; and removing the visualized object, or a portion of the visualized object in front of the hand, when there is an object hand block.

Another method for augmented reality (AR) safe visualization for use with a near to eye (NTE) display system worn by a user is provided. The method includes: at a processor associated with the NTE display system and programmed with an AR program, performing the operations of: receiving video input from a camera mounted to the NTE display system; receiving an intended task from a user input device; retrieving task data from a task database based on the intended task; video image processing the video input to identify and locate a user's hand; determining that the user is performing the intended task; processing the task data with the intended task to render a visualized job card on the NTE display system; determining when there is a job card block, defined as when the visualized job card is in front of the hand; and removing the visualized job card or a portion of the visualized job card causing the job card block when there is a job card block.

A system for augmented reality (AR) safe visualization for use with a near to eye (NTE) display system worn by a user is provided. The system includes: a controller comprising a processor programmed with an AR program and a task database storing task data; a camera mounted to the NTE display system and providing video input; a user input device providing an intended task having an associated object; the processor receiving the video input and coordinating the video image processing of the video input to identify therein a user's hand and the object; the processor receiving an intended task and retrieving task data including a job card based thereon; the processor determining that the user is performing the intended task; the processor processing the task data with the intended task to render a visualized job card; the processor determining when there is a job card block, defined as when the visualized job card is in front of the hand, and removing the visualized job card or removing a portion of the visualized when there is a job card block.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As mentioned, ensuring a user's safety during performance of a task presents a technological problem with the use of conventional AR systems. As used herein, "AR visualization" and "visualization" are interchangeable and visualization of items, such as, tools, objects, job cards, hands, and the like, refers to using AR to render images of the items on a see-through surface, such that the visualized items appear to the user to be in the user's view of the outside world. Examples of the see-through surface (FIG. 1, 20) include near to eye (NTE) display systems such as a lens of a pair of eyeglasses and a display windshield. Therefore, visualized items should not interfere with a user's vision or the user's view of his actual hands, his actual tools, and the actual object of an intended task. The provided systems and methods for AR safe visualization during performance of a task improve upon existing AR systems by addressing these technological problems in an unconventional way, in addition to providing other technological enhancements. The provided systems and methods for AR safe visualization during performance of a task may be used to provide visualization of different parts of a maintained device, to highlight and distinguish interesting parts of it, to display a window or text box with a section of maintenance tasks (which may be referred to as a job card), to display pages of a maintenance manual, and the like. The below description provides more detail as to these functions.

Figure 1:
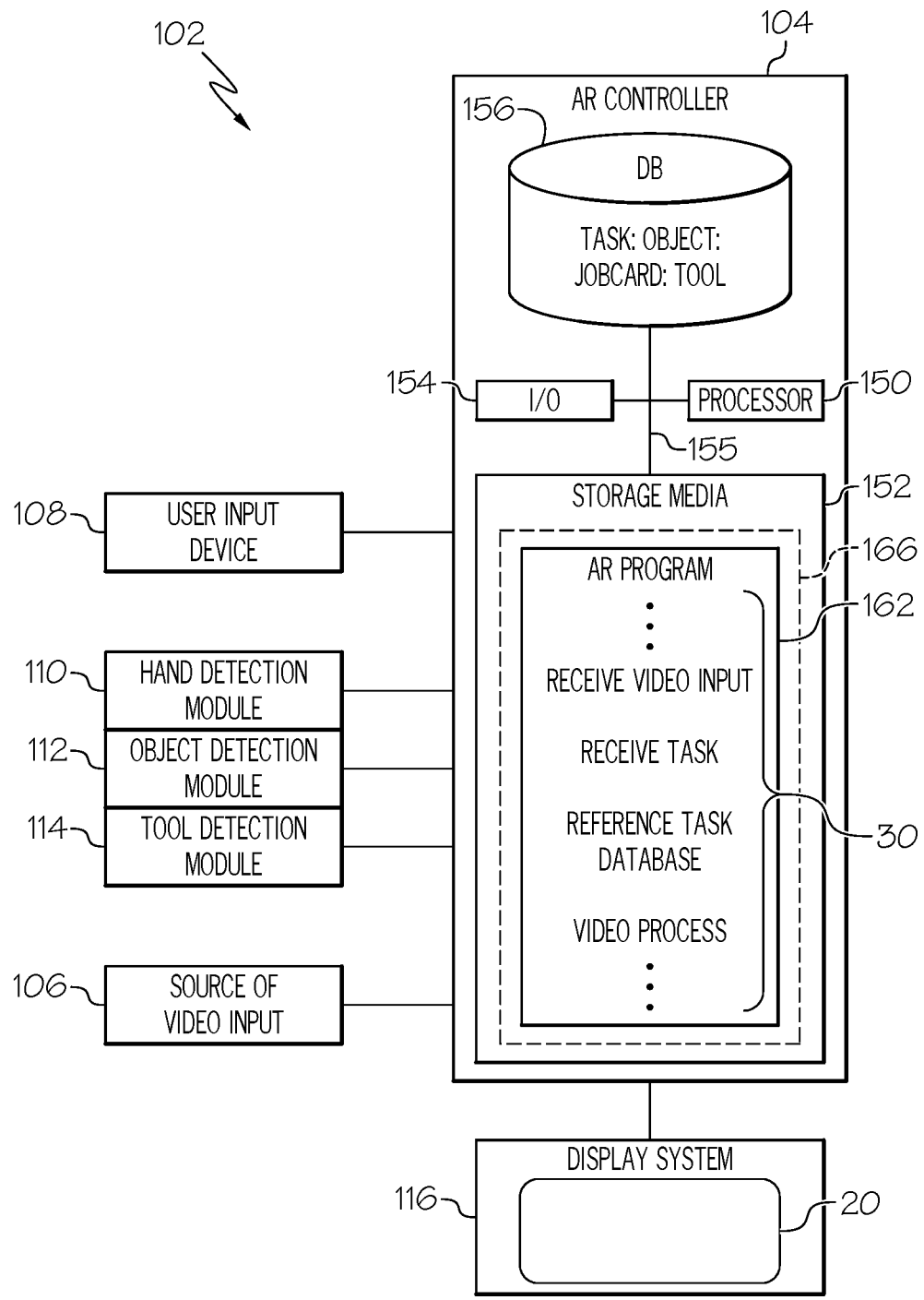
FIG. 1 is a functional block diagram illustrating a system for augmented reality safe visualization, in accordance with various exemplary embodiments.

Turning now to FIG. 1, a functional block diagram of a system for AR safe visualization during performance of a task 102 is depicted (shortened herein to AR system 102), in accordance with various exemplary embodiments. The AR system 102 includes a source of video input 106, a user input device 108, modules for video image processing (including a hand detection module 110, an object detection module 112, and a tool detection module 114), a NTE display system 116, and an AR controller 104.

Depending on the embodiment, the user input device 108 may be realized as a cursor control device (CCD), keypad, touchpad, keyboard, mouse, touch panel (or touchscreen), joystick, knob, line select key, voice controller, gesture controller, or another suitable device adapted to receive input from a user. Non-limiting examples of user input received via user input devices 108 include: selecting an intended task, loading or updating AR program 162 and stored variables, providing confirmations and/or cancellations for intended tasks, and loading and updating the contents of the database 156, each of which is described in more detail below.

The AR controller 104 receives video input and coordinates video image processing of the video input in order to identify and locate hands, objects, and tools. The algorithms used for video image processing may be provided by commercially available video processing modules. In some embodiments, the video input processing may be performed by one multifunctional algorithm in one multifunctional module. In other embodiments, the video input processing may be performed by separate algorithms. FIG. 1 depicts a separate hand detection algorithm in the hand detection module 110, an object detection algorithm in the object detection module 112, and a tool detection algorithm in the tool detection module 114.

The NTE display system 116 may be deployed as a being part of any one of a variety of wearable platforms, such as glasses, goggles, helmets, and other wearable display devices. The display system 116 may be implemented using any one of numerous known see-through display surfaces 20 suitable for rendering textual, graphic, and/or iconic information in a format viewable by a user. The display surface 20 may support AR visualization using two-dimensional images, three-dimensional images, and/or animations. Accordingly, each display system 116 communicates with the AR controller 104 using a communication protocol that is either two-dimensional or three-dimensional, and may support the visualization of text, alphanumeric information, objects, tools, visual symbology, and the like, as described herein.

In various embodiments, the source of video input 106 is a camera mounted to the NTE display system or associated wearable platform that a user may wear. The source of video input 106 is understood to be oriented to capture video input inclusive of a field of view of the user when the user is wearing the wearable platform. The video input is a video stream.

The AR controller 104 generates commands for the NTE display system 116 to employ AR render visualized items on the see-through surface 20. Rendering a visualized item may include sizing and orienting the visualized item to match the size, orientation, and perspective of an associated actual item. For example, rendering a visualized bolt may include sizing and orienting the visualized bolt so that it appears to fit right over the actual bolt; in a scenario like this, the visualized bolt may be rendered in a visually distinguishable color, to draw the user's attention to the location of actual bolt.

The AR controller 104 performs the functions of the AR system 102. As used herein, the term "controller" may be interchanged with the term "module;" each refers to any means for facilitating communications and/or interaction between the elements of the AR system 102 and performing additional processes, tasks and/or functions to support operation of the AR system 102, as described herein. In various embodiments, the controller 104 may be any hardware, software, firmware, electronic control component, processing logic, and/or processor device, individually or in any combination. Depending on the embodiment, the controller 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the AR controller 104 is depicted as a computer system comprising a processor 150 and a storage media 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The storage media 152 may comprise RAM memory, ROM memory, flash memory, registers, a hard disk, or another suitable non-transitory short or long-term storage media capable of storing computer-executable programming instructions or other data for execution. In various embodiments, the storage media 152 may be located on and/or co-located on the same computer chip as the processor 150. Generally, the storage media 152 maintains data bits and may be utilized by the processor 150 as storage and/or a scratch pad during operation. Information in the storage media 152 may be organized and/or imported from an external source during an initialization step of a process; it may also be programmed via a user input device 108.

During operation of the AR controller 104, as well as the AR system 102, the processor 150 loads and executes one or more programs, algorithms and rules embodied as instructions and applications, and specifically loads and executes the AR program 162, contained within the storage media 152. The AR program 162 comprises rules and algorithms that, when executed by the processor 150, determine the operations performed by the AR controller 104, such as "receive video input, receive intended task, reference task database, video process the video input, etc" (30). Novel AR program 162 and associated stored variables may be stored in a functional form on computer readable media, for example, as depicted, in storage media 152. While the depicted exemplary embodiment of the AR controller 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as storage media 152 and as program product time-based viewing of clearance requests in certain embodiments.

In various embodiments, the processor/memory unit of the controller 104 may be communicatively coupled (via a bus 155) to an input/output (I/O) interface 154 and a task database 156. The bus 155 serves to transmit programs, data, status and other information or signals between the various components of the controller 104. The bus 155 can be any suitable physical or logical means of connecting computer systems and components. This includes, but is not limited to, direct hard-wired connections, fiber optics, infrared and wireless bus technologies.

The I/O interface 154 enables intra-controller 104 communication, as well as communications between the controller 104 and other AR system 102 components, and between the controller 104 and any external data sources.

The I/O interface 154 may include one or more network interfaces and can be implemented using any suitable method and apparatus. The I/O interface 154 can support a variety of types of wireless communication, and can perform signal processing (e.g., digitizing, data encoding, modulation, etc.) as is known in the art. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the task database 156.

The task database 156 is a storage media that has stored therein a plurality of tasks. The tasks may be stored as a data string, having a tag portion that is the task name, and then having fields for an associated: object; job card; tool; etc. If a task does not have an associated tool, that field may be left empty. If, for a given field name, a task has more than one associated entry, the additional entries may be stored in sequence (for example, a first job card, and a second job card). In an embodiment, each task of the plurality of tasks has at least one associated job card. In an embodiment, each task of the plurality of tasks has an associated object and at least one associated job card. As mentioned, a job card is a piece of instruction, and its format may be alphanumeric, and/or include a symbolic image, and/or include an animation. In various embodiments, some tasks of the plurality of tasks also have an associated tool. For example, for a task, "refill the oil," the associated object may be a vehicle engine, and the associated first job card may instruct, "unscrew the oil cap." In this example tasks, there may not be an associated tool. In another example, the task is "change the oil," the object is again the vehicle engine, and the task may have an associated tool, such as a wrench. Additionally, the task "change the oil" may have multiple sequential job cards, such as "unscrew an oil drain plug," "wait until oil has stopped flowing out," etc. In various embodiments that have multiple job cards, the format of each job card may or may not be different than the format of those preceding it or succeeding it. The task database 156 is shown as being internal to the AR controller 104, however in other embodiments, task database 156 may be external to the AR controller 104.

It will be appreciated that the AR system 102 may differ from the embodiment depicted in FIG. 1. Having described the functional blocks within the AR system 102, we move to FIGS. 2-7 for illustrations of various use cases and to FIG. 8 for an exemplary embodiment of a method 800 associated with the AR system 102.

For illustrative purposes, the following description of method 800 may refer to elements mentioned above in connection with FIG. 1. In practice, portions of method 800 may be performed by different components of the described system. It should be appreciated that method 800 may include any number of additional or alternative tasks, the tasks shown in FIG. 8 need not be performed in the illustrated order, and method 800 may be incorporated into a more comprehensive procedure or method having additional functionality not described in detail herein. Moreover, one or more of the tasks shown in FIG. 8 could be omitted from an embodiment of the method 800 as long as the intended overall functionality remains intact.

The method starts, and at 802 the AR controller 104 is initialized. As mentioned above, initialization may comprise uploading or updating instructions and applications, the program 162, and the task lookup tables stored in the database 156.

At 804 video input is received, and at 806 the intended task is received. As mentioned, the intended task may be provided as user input from the user input device 108. In an embodiment, the intended task includes an actual object. At 808, the method 800 uses the intended task input to retrieve from the task database 156 task data, which includes at least a job card. In some embodiments, the task data includes a job card and a tool. In some embodiments, the task data includes a job card, a tool, and an object. In various embodiments, the intended task, when matched to tasks in the task database, retrieves multiple job cards, and/or multiple objects, and/or multiple tools.

At 810, the method 800 performs video image processing on the video input to identify and locate the user's hand (ie., the actual hand). In some embodiments, at 810, the method 800 performs image processing on the video input to identify and locate the user's hand and the actual object. In some embodiments, at 810, the method 800 performs image processing on the video input to identify and locate the user's hand, the actual object, and an actual tool. At 812, the method 800 processes the intended task with the retrieved task data and renders on the see-through screen 20 of the display system 116, one or more of: a visualized job card, a visualized tool, and a visualized object. In an embodiment, at 812, a visualized job card and a visualized object are rendered. In an embodiment at 812, a visualized job card, a visualized tool, and a visualized object are rendered. At this point, the user's field of view through the surface 20 includes the outside world plus the one or more visualized items.

At 814, the method 800 determines that the user is performing the intended task. In some embodiments, the AR controller 104 determines when the user is performing the task by detecting that the user has approached the object of the task (in this case, the engine 204). In some embodiments, the AR controller 104 determines when the user is performing the task by receiving user input so stating. The depicted field of view areas of FIGS. 2-7 are representative of potential views at operation 814.

Figure 2:
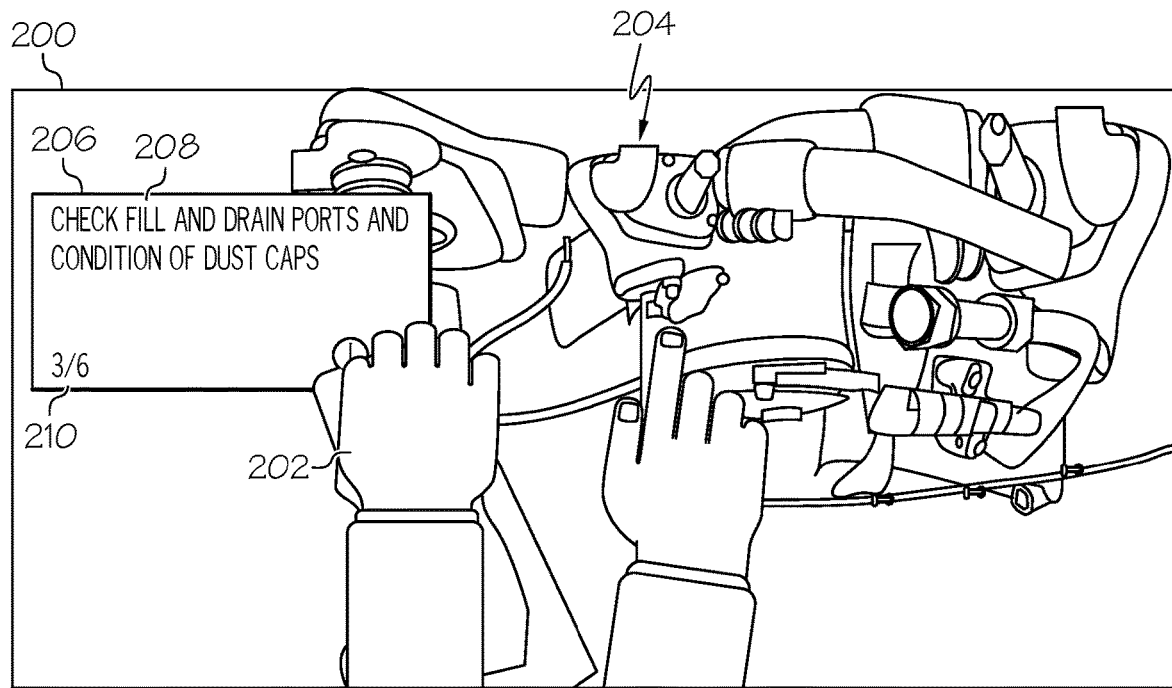
FIGS. 2-7 are illustrations showing several use cases for the system for augmented reality safe visualization, in accordance with various exemplary embodiments.

As shown in FIG. 2, area 200 represents a user's field of view. The user's actual left hand 202 is near the engine 204, and a job card 206 is visualized. In an embodiment, the visualized job card 206 appears like a text block on the left side of the user's view of the outside world and engine 204. In an embodiment, the job card 206 takes up less than one sixth of the overall area 200. In various embodiments, the job card 206 includes textual instructions 208, and a page indicator 210 (indicating that this is page 3 of 6 total job cards). In various embodiments, the job card 206 includes simple pictorial instructions. As can be observed in FIG. 2, the job card 206 is behind the user's hand 202 and occludes some of the user's view of the left portion of the engine 204.

Figure 3:
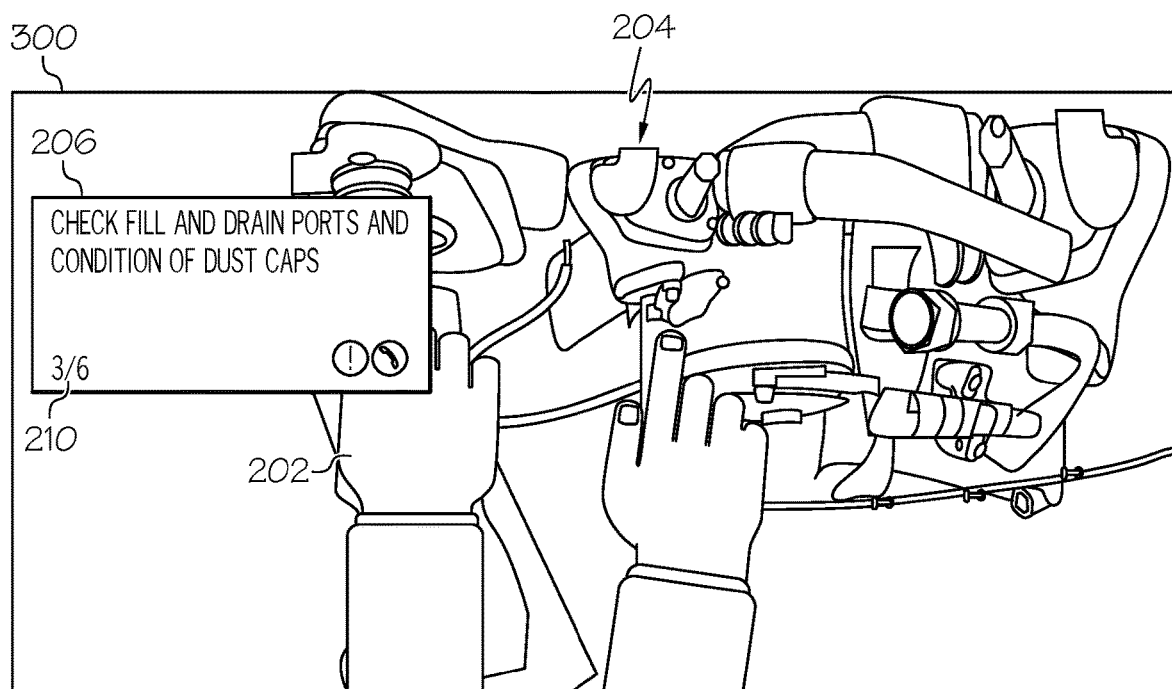
Figure 4:
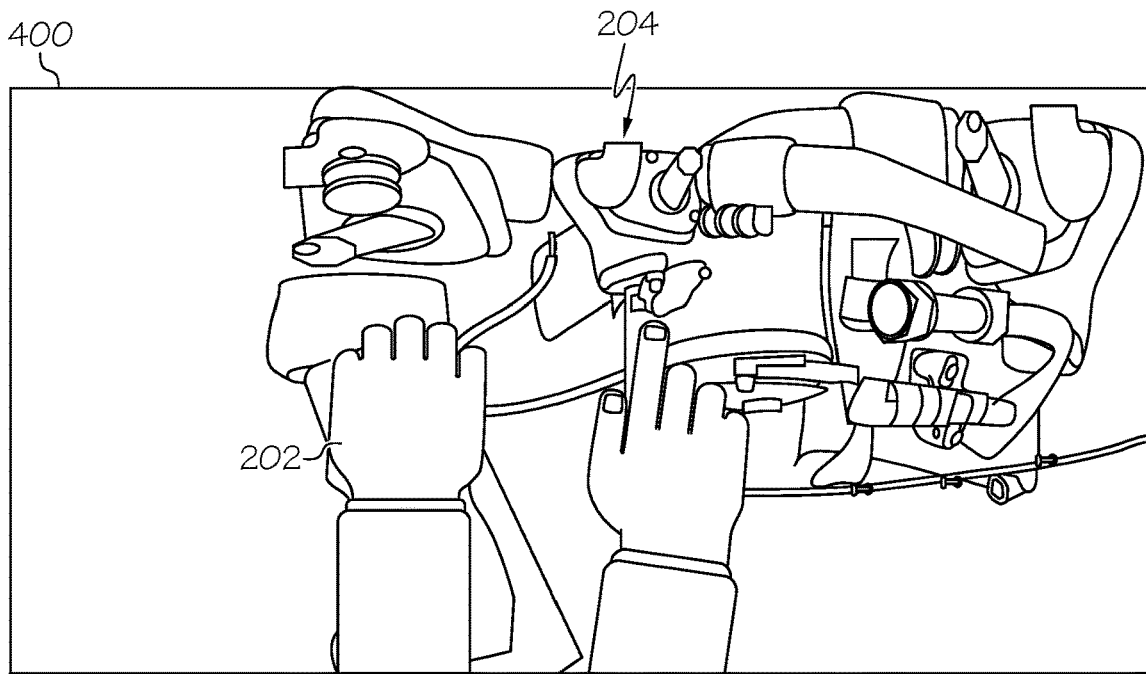
Figure 5:
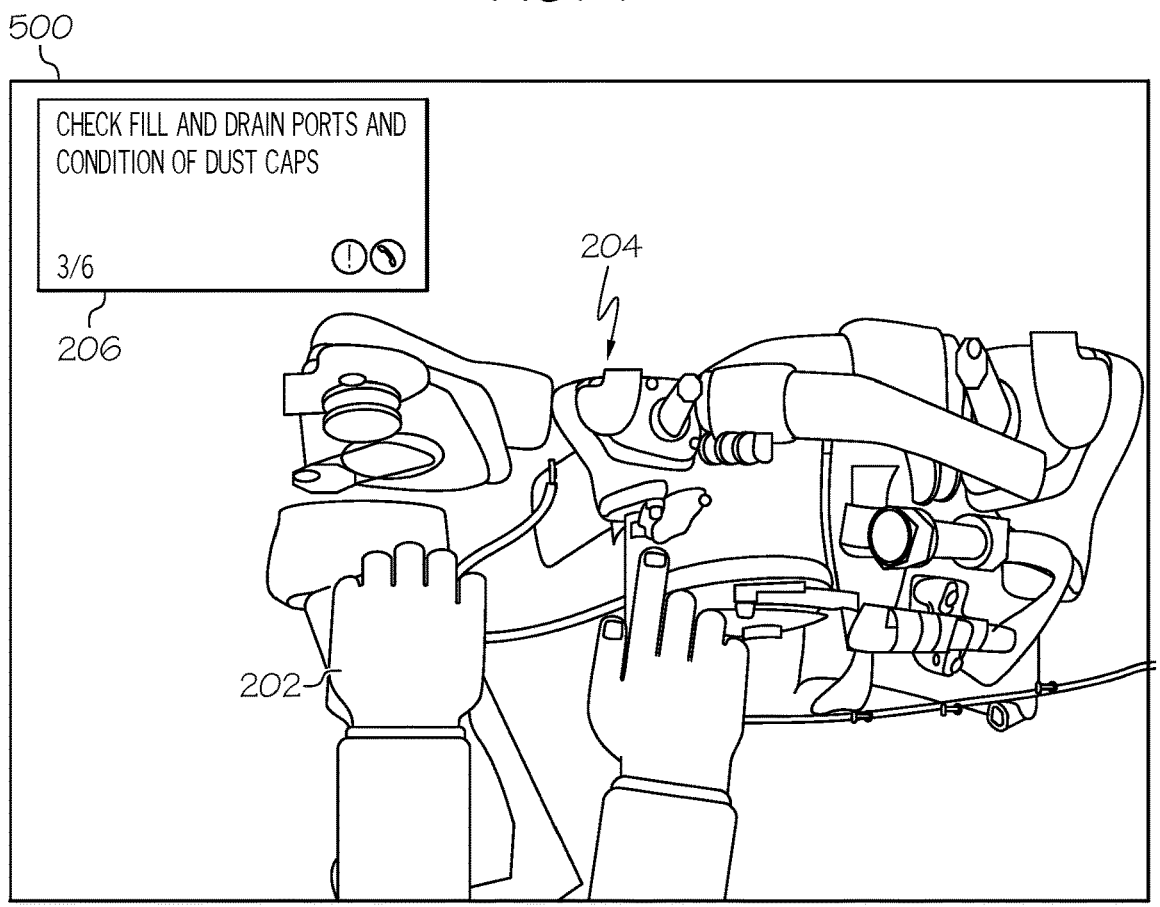

At some point during the performance of the task, the user's hand 202 may appear to go behind the visualized job card 206. This is depicted in FIG. 3, field of view area 300. The user's view of his hand is now at least partially blocked by the visualized job card 206, this is a job card block. At operation 816, the method 800 determines whether the user's hand or the user's actual tool is behind the visualized job card 206, (job card block) and if it is, at 818, the visualized job card 206 may be removed from the image (FIG. 4), it may be moved out of the user's view of his hand 202 and/or tool and the object of his task (FIG. 5), or a portion of the job card 206 responsible for the job card block may be removed. In FIG. 4, responsive to determining that there was a job card block, the AR controller 104 has removed the visualized job card 206, as shown in field of view area 400. As mentioned, in various embodiments, responsive to determining that there was a job card block, the AR controller 104 instead removes a portion of the visualized job card 206, that is in front of the user's hand or actual tool. In FIG. 5, field of view area 500, responsive to determining that there was a job card block, the AR controller 104 has moved the visualized job card 206 up and away from the user's hand 202, and away from the engine 204. Said differently, the visualized job card 206 is moved to a place on the see-through screen 20 on display system 116 in which it does not block the user's view of his hand 202 or of the engine 204. In various embodiments, moving the visualized job card 206 further includes rotating it clockwise or counter-clockwise, or changing its perspective to appear to extend lengthwise from closer to the user's eyes to farther from the user's eyes.

In summary, when there is a job card block (operation 816, FIG. 8), the controller 104 may respond by: removing the visualized job card, removing a portion of the visualized job card in front of the hand, or moving the visualized job card.

Figure 6:
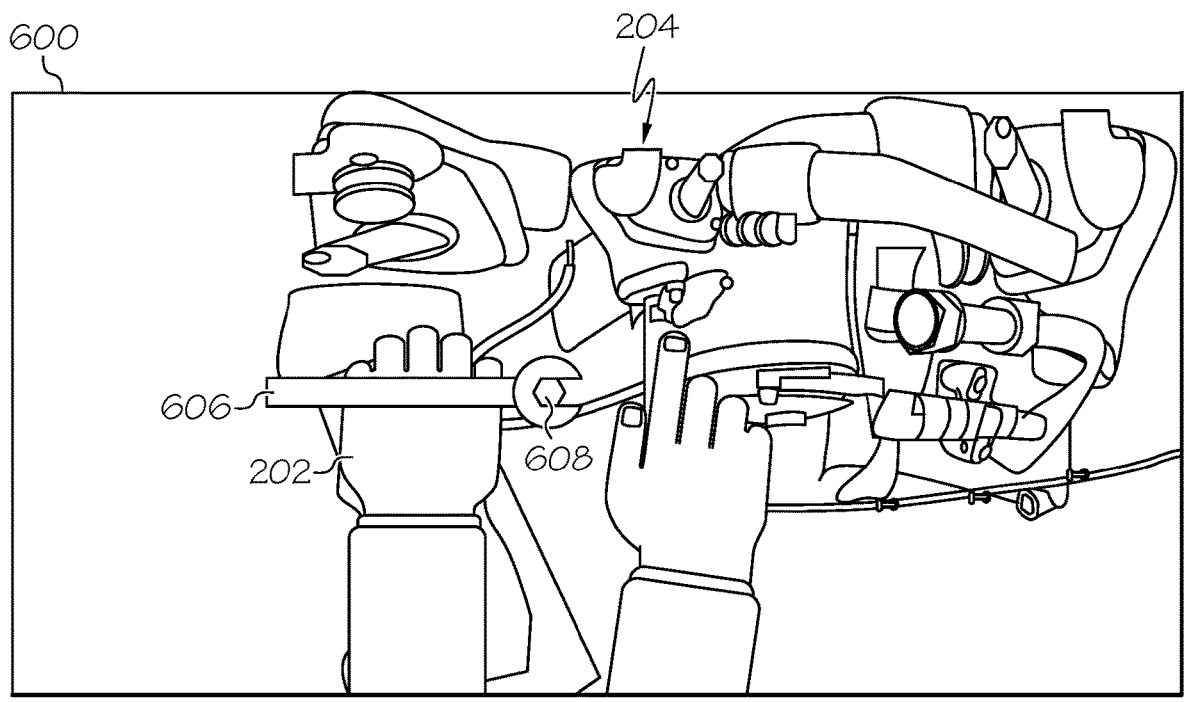
Figure 7:
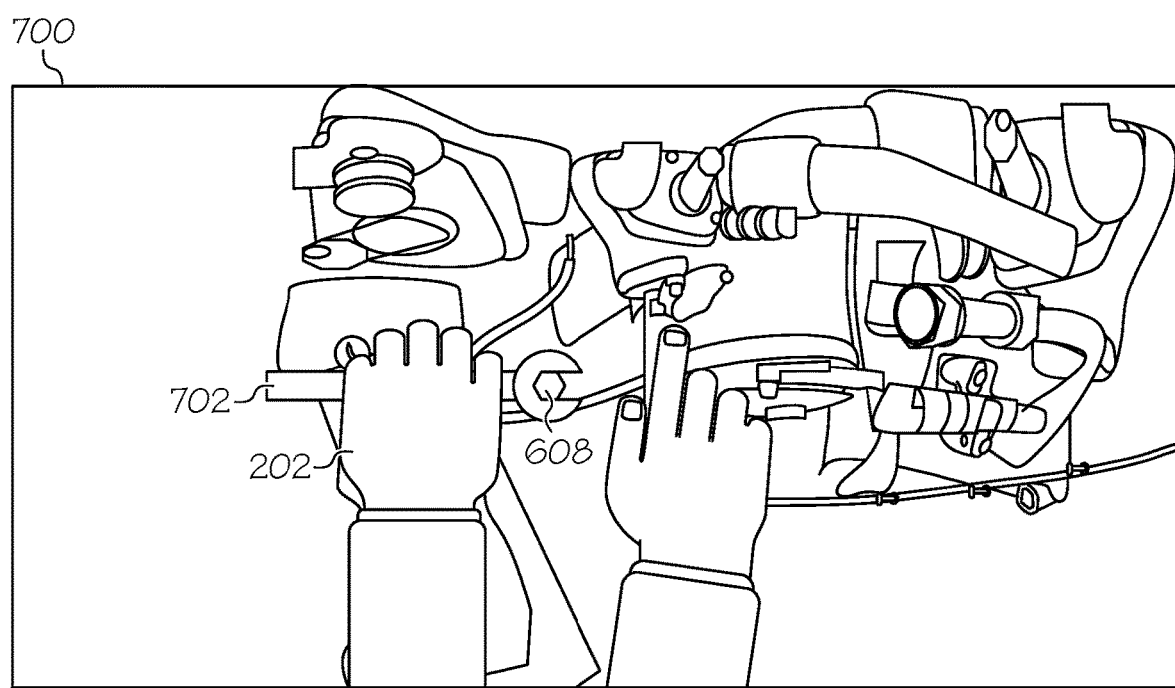
Figure 8:
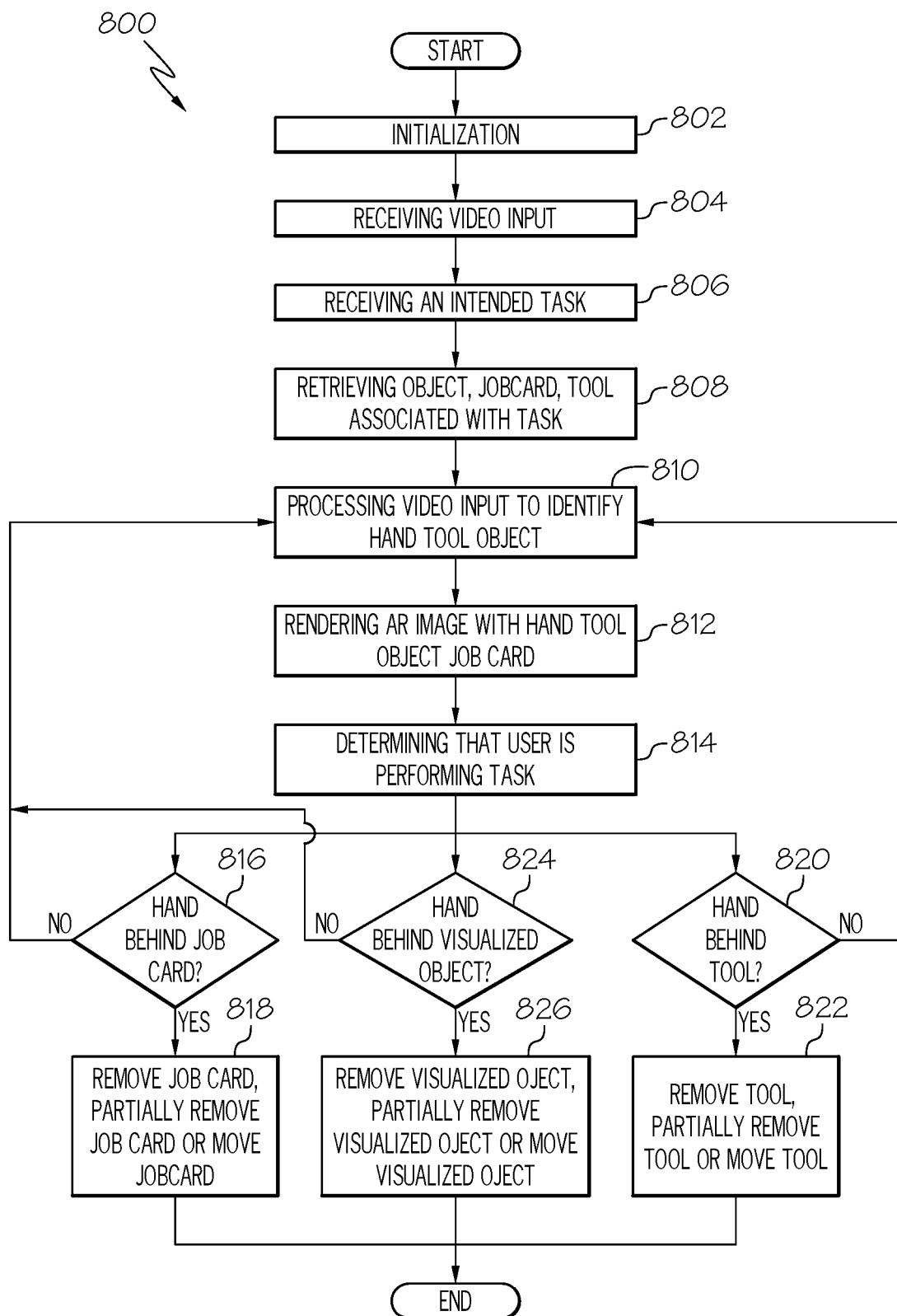
FIG. 8 provides a flow chart for a method for augmented reality safe visualization, in accordance with various embodiments.

In the example shown in FIGS. 6-7, the rendering of visualized objects and visualized tools is described. In the examples of FIGS. 6-7, the intended task is loosen a bolt 608, which includes the task and the object (the bolt), and the retrieved task data further includes using a wrench to loosen the bolt 608. As the user approaches the engine 204, the AR controller may render visualized wrench 606. As can be seen, the field of view area 600 shows the visualized wrench 606 fitted exactly to the bolt 608 and engaged with it. The visualized wrench 606 is not the same as an actual wrench, but it is rendered to be proportionate and in a perspective view. In various embodiments, the visualized wrench 606 is rendered with animation to show the turning movement that will be required to accomplish the task (e.g., counter-clockwise movement). In practice, responsive to this view 600, the user would likely obtain the actual wrench 702 and begin to move it to match a location and movement indicated with the visualized wrench 606. In various embodiments, if FIG. 6 were rendered in color, the visualized bolt that overlays actual bolt 608 might be treated as a visualized object, and such that it is rendered in a visually distinctive color with respect to the remainder of the engine 204 (for example, the visualized bolt may be red).

Moving now to FIG. 7, as mentioned herein, when the user begins the intended task, it is desirable for the user's view of his hands, his actual tool (the actual wrench 702), and the actual object that he is working on (i.e., the bolt 608 and/or the engine 204) to be unobscured. Accordingly, at 820, the method 800 determines whether the user's hand is behind the visualized tool 606 (a tool block) and if it is, at 822, one of the following is done by the controller 104: the visualized tool 606 is removed from the image (FIG. 7), a portion of the visualized tool 606 that blocks the user's hand or object of user's work is removed, or the visualized tool 606 is moved out of the user's view of his hand and the object he is working on. In various embodiments, at 824, the method 800 determines whether the user's hand or a user's actual tool is behind a visualized object (for example, the bolt 608, an object block) and if it is, at 826, the visualized object 608 is either removed from the image, a portion of the visualized object 608 responsible for the blocking is removed, or the visualized object 608 is moved out of the user's view of his hand and the object of his task.

In summary, when there is a tool block (operation 820, FIG. 8), the controller 104 may respond by: removing the visualized tool, removing a portion of the visualized tool in front of the hand, or moving the visualized tool. Likewise, when the controller 104 determines that there is an object block (operation 824, FIG. 8), the controller 104 may respond by: removing the visualized object, removing a portion of the visualized object in front of the hand, or moving the visualized object (operation 826, FIG. 8). In this manner, a user can be assisted in performing a technical task via the information associated with the visualization of certain items without the performance of this technical task being obscured, by these visualized items, from the user's view.

When the user's hand 202 is not blocked by visualized items (visualized tools, job cards, or objects, meaning there is no job card block, no tool block, and no object block) the method returns to 810 to continue video processing the video input. Also, when the user's actual tool is not blocked by visualized tools, job cards, or objects, the method returns to 810 to continue video processing the video input. After removing or moving visualized images of job cards (at 818), objects, and/or tools (at 822), the method may end or return to 810. When the method returns to 810 after having previously removed a visualized item, the AR controller 104 may determine that the visualized item or portion of visualized item would no longer cause a block and re-render the missing portion of the visualized item or the entire visualized item.

In various embodiments, at operation 816, the method 800 additionally identifies a job card block as including when the user's actual tool (e.g., wrench 702) is behind the visualized job card 206, and if it is, at 818, the visualized job card 206 is either removed from the image, or it is moved out of the user's view of his actual tool and the object he is working on. Said differently, the visualized job card 206 is moved to a place on the see-through screen 20 on display system 116 in which it does not block the user's view of his actual tool (e.g., wrench 207) or of the engine 204.

In various embodiments, at operation 820, the method 800 additionally identifies a tool block as including when the user's actual tool (e.g., wrench 702) is behind the visualized tool 606, (tool block) and if it is, at 818, the visualized tool 606 is either removed from the image, or it is moved out of the user's view of his actual tool and the object he is working on.

As is readily appreciated, the above examples are non-limiting, and many others may be addressed by the AR controller 104. Thus, systems and methods for enhanced computer vision systems have been provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

The invention claimed is:

1. A system, comprising:
 a memory, the memory storing one or more software modules; and
 one or more processors configured to execute the one or more software modules, that when executed perform a method including:
 receiving video input from a video source associated with an augmented reality display system;
 receiving a task from a user input device;
 receiving task data from a task database based on the received task;
 identifying and locating a user's hand in the received video input;
 determining that the user is performing the task;
 rendering a visualized item on the display system based on the task and the task data;
 determining whether there is a visualized item block, the visualized item block being when the visualized item is in front of the user's hand on the display system; and
 in accordance with a determination that a visualized item block exists, removing at least a portion of the visualized item from in front of the user's hand.

2. The system of claim 1, wherein the method further includes:
 identifying and locating the user's actual tool;
 determining whether the visualized item block exists, wherein the visualized item block further includes when the visualized item is in front of the user's actual tool; and
 in accordance with a determination that the visualized item block exists, removing at least a portion of the visualized item from in front of the user's actual tool.

3. The system of claim 1, wherein the method further includes:
 determining whether the at least the portion of the visualized item would no longer cause the visualized item block; and in accordance with a determination that the at least the portion of the visualized item would no longer cause the visualized item block, re-rendering the at least the portion of the visualized item on the display system.

4. The system of claim 1, wherein rendering the visualized item on the display system includes sizing and orienting the visualized item to match a size, orientation, or perspective of a respective actual item.

5. The system of claim 1, wherein rendering the visualized item on the display system includes rendering a plurality of visualized items on the display system based on the task and the task data.

6. The system of claim 1, wherein removing at least a portion of the visualized item from in front of the user's hand includes at least one of:
 completely removing the visualized item from the display system;
 removing a portion of the visualized item from the display system; or
 moving the visualized item within the display system so that the at least the portion of the visualized item is no longer in front of the user's hand.

7. The system of claim 1, wherein the visualized item is a visualized job card for the task.

8. The system of claim 1, wherein the visualized item is a visualized object for the task.

9. The system of claim 1, wherein the visualized item is a visualized tool for the task.

10. A method, comprising:
 receiving, by one or more processors, video input from a video source associated with an augmented reality display system;
 receiving, by the one or more processors, a task from a user input device;
 receiving, by the one or more processors, task data from a task database based on the received task;
 identifying and locating, by the one or more processors, a user's hand in the received video input;
 determining, by the one or more processors, that the user is performing the task;
 rendering, by the one or more processors, a visualized item on the display system based on the task and the task data;
 determining, by the one or more processors, whether there is a visualized item block, the visualized item block being when the visualized item is in front of the user's hand on the display system; and
 in accordance with a determination that a visualized item block exists, removing, by the one or more processors, at least a portion of the visualized item from in front of the user's hand.

11. The method of claim 10, further including:
 identifying and locating, by the one or more processors, the user's actual tool;
 determining, by the one or more processors, whether the visualized item block exists, wherein the visualized item block further includes when the visualized item is in front of the user's actual tool; and
 in accordance with a determination that the visualized item block exists, removing, by the one or more processors, at least a portion of the visualized item from in front of the user's actual tool.

12. The method of claim 10, further including:
 determining, by the one or more processors, whether the at least the portion of the visualized item would no longer cause the visualized item block; and in accordance with a determination that the at least the portion of the visualized item would no longer cause the visualized item block, re-rendering, by the one or more processors, the at least the portion of the visualized item on the display system.

13. The method of claim 10, wherein rendering the visualized item on the display system includes sizing and orienting, by the one or more processors, the visualized item to match a size, orientation, or perspective of a respective actual item.

14. The method of claim 10, wherein rendering the visualized item on the display system includes rendering, by the one or more processors, a plurality of visualized items on the display system based on the task and the task data.

15. The method of claim 10, wherein removing at least a portion of the visualized item from in front of the user's hand includes at least one of:
completely removing, by the one or more processors, the visualized item from the display system;
removing, by the one or more processors, a portion of the visualized item from the display system; or
moving, by the one or more processors, the visualized item within the display system so that the at least the portion of the visualized item is no longer in front of the user's hand.

16. The method of claim 10, wherein the visualized item is a visualized job card for the task.

17. The method of claim 10, wherein the visualized item is a visualized object for the task.

18. The method of claim 10, wherein the visualized item is a visualized tool for the task.

19. A system, comprising:
a memory, the memory storing one or more software modules; and
one or more processors configured to execute the one or more software modules, that when executed perform a method including:
receiving video input from a video source associated with an augmented reality display system;
receiving a task from a user input device;
receiving task data from a task database based on the received task;
identifying and locating a user's hand in the received video input;
determining that the user is performing the task;
rendering a visualized item on the display system based on the task and the task data;
determining whether there is a visualized item block, the visualized item block being when the visualized item is in front of the user's hand on the display system;
in accordance with a determination that a visualized item block exists, removing at least a portion of the visualized item from in front of the user's hand, wherein the removing at least the portion of the visualized item includes at least one of:
completely removing the visualized item from the display system;
removing a portion of the visualized item from the display system; or
moving the visualized item within the display system so that the at least the portion of the visualized item is no longer in front of the user's hand;
determining, by the one or more processors, whether the at least the portion of the visualized item would no longer cause the visualized item block; and
in accordance with a determination that the at least the portion of the visualized item would no longer cause the visualized item block, re-rendering, by the one or more processors, the at least the portion of the visualized item on the display system.

20. The system of claim 19, wherein the method further includes:
identifying and locating the user's actual tool;
determining whether the visualized item block exists, wherein the visualized item block further includes when the visualized item is in front of the user's actual tool; and
in accordance with a determination that the visualized item block exists, removing at least a portion of the visualized item from in front of the user's actual tool.

* * * * *